3,279,936
**TREATING SURFACES WITH PERFLUORO-
CARBON POLYMERS**
Clarence W. Forestek, Broadview Heights, Ohio
(% Forestek Plating & Mfg. Co., 9607 Quincy
Ave., Cleveland, Ohio)
Filed July 22, 1965, Ser. No. 474,130
19 Claims. (Cl. 117—2)

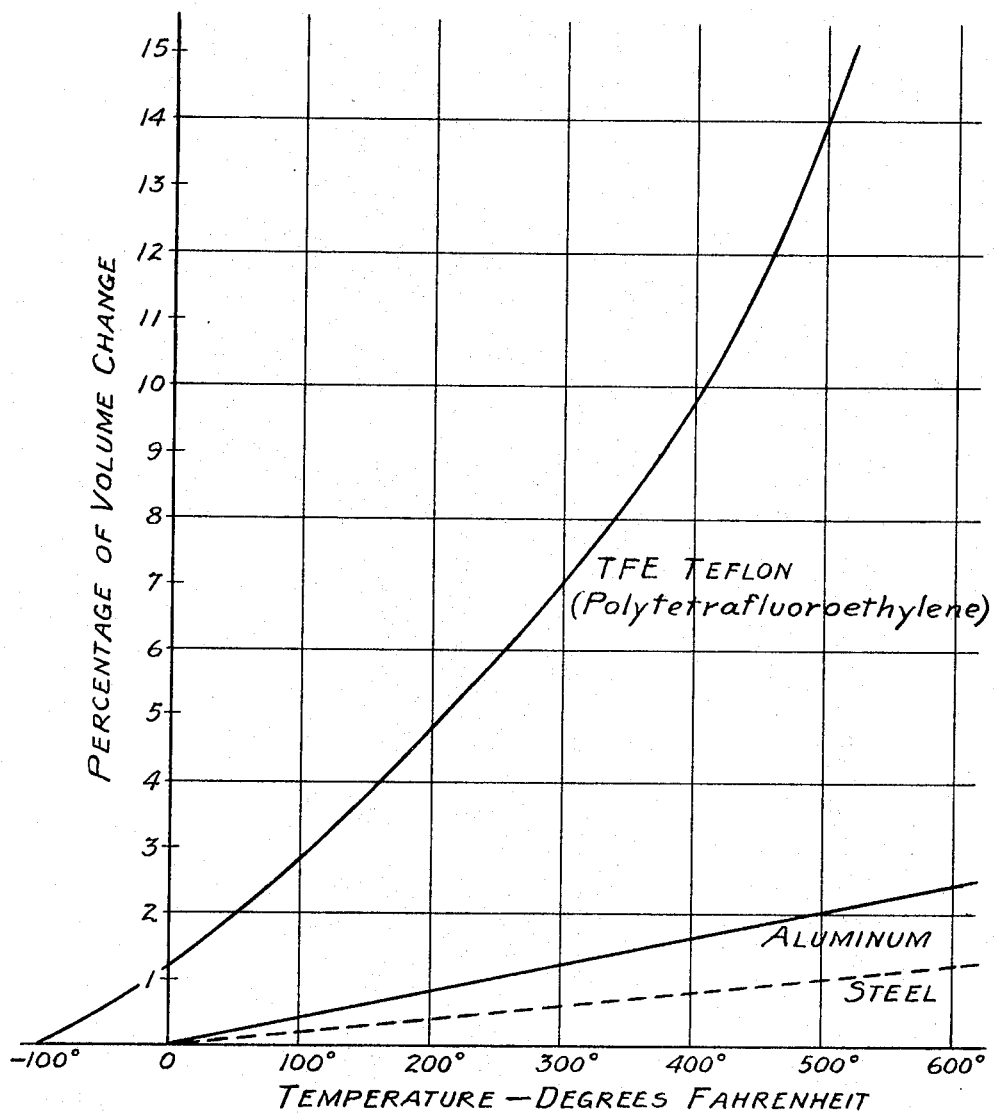

This application is a continuation in part of application Serial Number 414,423 filed November 27, 1964.

This invention relates to treating porous surfaces with low-friction perfluorocarbon resins such as polytetrafluoroethylene.

The invention further relates to a process for disposing finely-divided solid lubricating particles of such resins in fissures of a porous metallic surface so that they are mechanically locked into the surface. Such a treatment, in accordance with the process of the present invention, imparts not only low-friction and low-adhesion properties to the treated surface, but simultaneously retains some of the other desirable physical properties of metallic surfaces such as hardness, rigidity and high thermal conductivity.

The more common methods for treating surfaces with perfluorocarbon polymers, which have almost no affinity for any other substance, have required the application of the material in the form of a resin enamel. Such coatings are not suitable for many purposes due to difficulty in bonding the coatings to the underlying surfaces. Also, coatings of perfluorocarbon polymers have low thermal conductivity, poor hardness and high dielectric properties. These properties are undesirable for many applications.

It has been proposed to fuse resinous perfluorocarbon polymers in the form of comminuted particles to a metallic surface, using temperatures between 440° to 760° F. to form an amorphous layer. Such methods, however, are not always operative, are costly, and are extremely time-consuming. They also seldom provide but a modicum of adhesion of the polymer to the underlying metal surface.

Various other techniques have been proposed for attempting to mechanically bond a coating of perfluorocarbon to surfaces, such as are disclosed in U.S. Patents Nos. 2,944,917 and 3,115,419. These patents relate to the use of etchants to provide pores or cavities in the surface, thus enabling the resin in a fluid state to enter such cavities as well as covering the balance of the metal surface in a manner known as "keyholing," and are intended to overcome the inherent non-adhesiveness of the perfluorocarbon to the metal surface.

While the above advantages and properties of perfluorocarbon polymers suggest many useful applications, these same properties themselves heretofore have limited the use to which present technology can accommodate such materials. For example, the utter chemical inertness of polytetrafluoroethylene makes it difficult, if not impossible, to achieve a good bond between such coatings and the underlying surface. In the case of coated cooking ware presently in use, the coating can be easily scraped off with metal objects and special precautions must be taken.

One object of the present invention is to provide a process of locking perfluorocarbon polymer particles into a metallic surface to form a discontinuous layer whereby the lubricating, low-friction and low-adhesive characteristics of such polymer are imparted to the surface while some of the other desirable physical properties of the metallic surface such as hardness, rigidity and thermal conductivity are retained.

Other objects and advantages of the present invention will become apparent from the following description and appended claims.

Briefly, the present invention comprises a first step of treating a surface, usually a metallic surface, to provide a plurality of minute interstices, pores, cavities or fissures on or in the metal surface. This is accomplished, for instance, (a) by mechanical treatment or pretreatment such as liquid-honing or sand blasting, (b) by forming an integral phosphate coating on the surface, or (c) by plating the surface with nickel, chromium or other suitable metals and forming fissures in that plating by acid etching, or by anodic or cathodic electrolysis. If the metallic surface inherently has the desired network of minute fissures or interstices, this first step is, of course, not needed. An example of such a surface would be certain sintered or powdered metal materials or certain sprayed metal surfaces.

As a second step, the treated surface is preferably heated above at least 150° F. to enlarge the fissures or the like by thermal expansion of the metal. When the surface has been heated to the desired temperature, finely divided particles of perfluorocarbon resin preferably at room temperature or below are deposited on the heated surface and forced into the fissures or interstices in the surface such as by brushing on an aqueous dispersion of the material or by dusting with dry perfluorocarbon powder or air blasting with the dry powder to substantially fill the minute fissures. Fision of the perfluorocarbon particles is to be avoided.

While still hot, the coated surface may be rubbed, burnished, scrubbed or otherwise treated to further compact the particles in the enlarged fissures. It is then cooled to reduce the size of the fissures and to mechanically lock the expanded perfluorocarbon particles therein by an interference fit. The surface may also then be scoured, polished or glazed as desired to remove excess material and improve the surface appearance.

The portion of the total surface area comprising the entrapped particles of solid lubricant may be from 5 to 75% and preferably is between about 10 to 60%. The surface is discontinuous in the sense that it is not completely covered by a perfluorocarbon resin layer. It is believed that the resin particles comprise something around about 40% of the surface area. The resulting surface generally feels extremely smooth, is much harder than surfaces completely coated with a layer of solid lubricant, and exhibits the combination of high lubricity, good mechanical strength and high thermal conductivity. In addition, the solid lubricant particles appear to be protected from damage due to rubbing or scraping by this form of discontinuous surface.

The average size of the perfluorocarbon particles should be between 0.05 to 30, and preferably 0.5 to 10 microns as such is measured and understood in the art. The particle size should be such that the unexpanded particles will enter or can be forced into the fissures in the surface. Theoretically, it is contemplated that the particle size be correlated with the size of the width of the fissures so that there are from one to perhaps five particles across the width of each fissure.

As used in the specification and claims, the term perfluorocarbon is defined as (a) polytetrafluoroethylene, (b) mixtures of polytetrafluoroethylene and polymonochlorotrifluoroethylene, (c) polymonochlorotrifluoroethylene, (d) copolymers of tetrafluoroethylene with hexafluoropropylene (e) mixtures of polytetrafluoroethylene and polytetrafluoropropylene and (f) equivalents thereof. Of the foregoing plastics, (a) and (b) are highly preferred. In particular, polymeric materials (a) and (b) are insoluble, heat-resistant and resistant to chemical attack. In addition, these materials slide on themselves and on metals with the lowest static coefficients of friction of any solids, polymer (a) being 0.04 and polymer (b) being 0.05 respectively compared to 0.09 for graphite, as well as possessing many chemical properties far superior to graphite.

By perfluorocarbon I comprehend that class of polymers characterized by an absence of hydrogen atoms, and a preponderance of fluorine atoms in which there are at least three fluorine atoms for each other halogen atom (such as chlorine), such polymers being formed from ethylene or propylene. I also comprehend within the scope of my invention polymers which have resistance to high temperatures, lubricity, chemical inertness and coefficients of expansion which are substantially equivalent to polytetrafluoroethylene for the intended use.

Further description of perfluorocarbon polymers and their methods of manufacture is found in U.S. Patents Nos. 2,230,654 and 2,946,763.

In further explanation of the invention, reference is made to FIG. 1 in which the percentage of volume change or volumetric coefficient of expansion in percentage of TFE Teflon (one type of polytetrafluoroethylene), aluminum and steel is plotted against temperature in degrees Fahrenheit.

The graph is representative of what I understand the circumstances to be starting at —100° F. for the TFE Teflon and 0° F. for the aluminum and steel. From this, it can be seen that TFE Teflon has much greater coefficient of expansion than steel or aluminum so that if TFE Teflon at say —100° F. is applied to steel at 400° F. there is a differential of 500° F. and the TFE Teflon will expand something between 9 and 10 percent. This differential provides what might be called an interference fit and constitutes the source of the force which mechanically locks the perfluorocarbon particles into the surface of application. It can be seen that if the TFE Teflon starts at a lower temperature, the TFE Teflon curve shifts to the left on the graph and a greater interference fit is obtained.

For purposes of the present invention, the temperature differential between the perfluorocarbon particles and the surface of application should be at least 250° F. and preferably 350° F. To achieve such differential, the particles can be applied at room temperature (about 60° F.) or preferably below room temperature when applied to the metal surface. I prefer to cool the perfluorocarbon particles to about —100° F. by means of Dry Ice or solid carbon dioxide to retard their expansion until compaction into the fissures is achieved.

Liquid nitrogen, going down to —400° F. may also be employed to obtain the required temperature differential. Alternatively, I can keep the particles in the freezer of an ice box or deep freeze apparatus.

The surface to which the particles are to be applied may be treated in several ways to make it porous or provide a number of fissures or interstices into which the particles are fitted. As will be apparent to those skilled in the art, the surface may be electroetched by anodic or cathodic treatments in an acid or alkaline solution varied to suit the particular metal involved.

Alternatively, the surface may be treated with a suitable phosphate coating bath to form an integral phosphate coating on it, such coatings having a plurality of minute fissures in them.

The surface may be plated with electroless nickel, hard chromium, or other coatings known in the art and then such coating suitably treated to form a porous surface. Aluminum surfaces may be anodized or hard anodized.

For molds, the treated surface is preferably heated to from about 350° to about 500° F. to enlarge the fissures by heat expansion. While the surface is still hot, finely divided particles of the desired lubricating polymer at room temperature or below are disposed in the interstices in the surface. The particles may be applied in the form of a dispersion in water, or in powder form.

The surface may be burnished while still hot with a rotating steel brush, felt pads, fiber brush or other suitable means to further compact the chilled particles in the fissures and to remove the polymer material not within the fissures, leaving alternate, random, surface areas of clean metal and polymer which I characterize as a discontinuous surface. I also contemplate that the particles may be deposited onto the surface and forced into the fissures by air blast techniques.

In disposing the particles onto the treated surface and compacting or forcing the particles into the fissures in such surface, every effort should be made to complete all steps in the operation before the surface cools to any significant extent and before the particles likewise heat up. In other words, the temperature differential should be maintained and the treatment effected expeditiously. I can treat large molds in less than twenty-five minutes by hand brushing. In this period of time, the temperature of the mold changes very little.

When powdered polytetrafluoroethylene obtained by breaking up or grinding up the frozen polymer is used, the irregular shapes and sizes of the polymer particles give excellent results. Powdered "Teflon," commercially available under the trade designation "522X" is particularly suitable for this purpose. Other suitable commercially available products are "Rilube 63" and "TL 126." A dispersion of perfluorocarbon particles in distilled water suitable for this purpose is commercially available under the trade designation "Teflon 30."

The powdered material which is commercially available appears to be a mixture of small micron and submicron sized particles. When applied to a surface, I believe that the submicron particles fit in the interstices while many of the larger particles do not and thus are not utilized. Uniform powders of submicron-sized particles are not available commercially. For most applications, I prefer to work with the smaller sized particles.

In another embodiment of the present invention, the polymer is super-cooled in a freezer or with Dry Ice to a temperature of as low as —100° F. down to —400° F. and disposed on the surface in dry powdered form as quickly as possible to permit the particles to be brushed, burnished or forced into the surface fissures before they expand. Here the surface to which the particles are applied may be at room temperature. The principal consideration is that suitable temperature differential exist to provide an interference fit and lock the particles in place at the temperature of usage. Because the refrigerated particles must absorb considerable heat from the surface before they expand, sufficient time is allowed to work the unexpanded particles into the surface.

The surface to which the particles are to be applied should preferably be heated about 50 to 100° F. above the temperature to which it will be subjected in use and a temperature differential established in the perfluorocarbon particles to provide a suitable interference fit at the temperature of usage. Such factors are difficult to measure accurately and certain trial and error experimentation will be required.

For the purpose of this description, the temperature of usage shall means the average temperature in the temperature range to which the surface is heated during normal operation. For example, in the case of tire vulcanizing molds, the temperature range may be from about 240° F. to about 400° F. and the temperature of usage is 320° F.

The temperature limit to which the surface may be heated is about 650° F. and preferably should be less than about 500° F. An advantageous temperature range for heating a surface is about 250° F. to 450° F. Fusion of the particles is to be avoided in the course of application to a surface so that, as disposed in the pores of the surface of the treated article, the particles are unfused.

The surface treatment may be renewed if desired, after particles have become dislodged from the minute fissures due to extended use or other causes. This renewal is preferably accomplished by freezing or supercooling the particles in Dry Ice and then working the particles into the surface with the surface at or above its temperature of operation. The surface may be specially heated prior to the renewal treatment, if desired and advantageous. Renewal of the surface my be effected on a daily, weekly or other bases as required. In certain rubber molding operations, for example, I have found that daily renewal is desirable.

The invention is best illustrated by the following examples which are, however, not to be considered as limiting the scope of the invention.

*Example I*

A multi-cavity matched die mold consisting of two steel plates for molding small rubber articles is cleaned and prepared for treatment using procedures well-known to those skilled in the art and which are commonly performed prior to zinc phosphating. The cleaned molding surfaces are phosphatized for 10 minutes at 195° F. to produce a microcrystalline zinc phosphate coating on the metal surface.

The plates are then heated to 400° F. in an electric oven to enlarge the minute fissures and submicron to about 10 microns polytetrafluoroethylene particles refrigerated to about —100° F. are brushed evenly over the entire heated molding surface.

Promptly and as the heated plates begin to cool, the surface is brushed manually with a fiber brush and then burnished with a rotating Tampico end brush to further deposit and compact the particles only in the fissures.

The plates are then cooled to room temperature to contract the fissures and tightly lock the particles in the surface.

After this treatment, the release properties of the mold are greatly improved and greatly reduced quantties of release agent are needed. The surface is thereafter renewed daily and the mold may be kept in constant use for over six months.

*Example II*

Eight steel core members for use in molds for neoprene articles are plated with electroless nickel, e.g., sodium hypophosphite, chemical plated non-electrolytically by techniques well known to those skilled in the art as described in U.S. Patent No. 2,532,283 to Brenner et al. The plating process produces a nickel layer of a thickness between 0.0002 and 0.0003 inch after the plated surface was liquid-honed with 280 grit at an air pressure of 120 pounds. The plating resulting from this treatment has a fine network of minute fissures over the entire surface.

The plated cores are then heated to about 450° F. in an electric oven to enlarge the minute fissures and a suspension of polytetrafluoroethylene particles in distilled water, is brushed evenly over the entire plated surface, leaving a residue of particles on the surface and in the enlarged fissures. As the core members begin to cool, the entire surface is burnished with a clean dry cotton cloth to further deposit and compact the particles in the fissures. For renewal, refrigerated polytetrafluoroethylene powder was applied as previously described.

The treated cores have exceptional release characteristics in the molding of neoprene articles and are kept in service for many months.

*Example III*

Two large steel plates of the type described above in Example I are cleaned and hard-chrome plated to a thickness of about 0.001 inch. The chrome surface is then treated to provide a fine network of minute fissures or interstices by reversing current (i.e. reversing the anode and cathode connections) in a chromic acid electrolyte for two minutes at 4.0 volts with direct current.

The surface is then rinsed with a basic 0.2% aqueous sodium bicarbonate solution to neutralize the chromic acid. After drying, the plates are heated in an electric furnace to 400° F. to enlarge the fissures by expansion.

After the plates are removed from the oven, they are immediately dusted with finely-divided particles of polytetrafluoroethylene of about 10 micron particle size which have been previously refrigerated to cool the particles to around —100° F. The dusting is repeated three times as the heated plates cool. Immediately after each dusting, the surface is rapidly burnished with a rotating felt burnishing tool to work the particles into the enlarged fissures before the particles become expanded in size by being heated on the plated surface. The plates are then allowed to cool to room temperature, whereby the fissures decrease in dimension to normal size to mechanically lock the particles therein.

In a variant of this invention, I also contemplate additional "locking in" of the perfluorocarbon particles by coating over a treated surface. Thus, an overlapping layer will further hold the perfluorocarbon particles in the surface.

*Example IV*

A hard anodized aluminum article is heated to about 300° to 400° F. to enlarge the fissures, either as present inherently in the oxide coating or as exaggerated by etching of the anodic coating with hot sulfuric or other agents. Perfluorocarbon particles from sub-micron to about 20 microns in size, that have been chilled to —100° F. using liquid carbon dioxide, are burnished into the surface using natural bristle brushes. This operation may be repeated two or more times to assure complete coverage. Additional burnishing with a fine stainless steel wire brush rotating at a peripherial speed of 3000 to 5000 f.p.m. will aid in compaction of the particles and further smooth the anodic coating.

At this writing, the principal use of the present invention is for treatment of molds for molding plastic and rubber articles in which application it effects substantial savings.

Other applications are within the scope of the invention where lubricants are required which have not only the ability to withstand heat, but also the ability to dissipate heat due to high thermal conductivity. For example, surface treatments according to the invention may be performed on such items as the interior surfaces and especially the dies of extrusion equipment, in cooking and baking equipment, in bearings, in valves, idler rolls and fluid vessels, in metal-forming equipment, in conduits for fluids, in pumps, in surgical equipment, funnels, extrusion orifices, in ice-making equipment, laminating platens, in electrical brush contacts, mandrels, paint mixers and drums, marine hardware, propellers, in fastening devices, in switches, in electric relays, in chemical vessels, fractionation columns, evaporator coils for refrigeration and air conditioning units, gear trains, thermal sealing devices, slides, core pins, cams, toggles, plastic film handling and sealing.

Some of the advantages which the treatment affords in the above applications include the prevention of corrosion (since all of the surface cavities in which moisture and corrosion materials might collect are filled) and the elimination of cleaning problems as well as the lubricity features hereinbefore described.

Having thus described my invention, I claim:
1. A process which comprises:
   (a) heating a porous surface to at least 150° F. and not more than 650° F. to enlarge the pores thereof;
   (b) promptly thereafter depositing finely divided perfluorocarbon polymer particles onto said heated surface and working said particles into said pores, said particles being at a temperature no higher than room temperature; and,
   (c) permitting said surface to reach temperature equilibrium and thereby lock said particles into the pores in said surface by an interference fit.
2. A process for treating a metal surface with finely-divided perfluorocarbon polymer particles, which comprises:
   (a) plating said surface with a layer of plated-on metal;
   (b) providing a multiplicity of minute fissures in said layer;
   (c) heating said layer to a temperature of between 150° F. and 650° F. to enlarge said fissures, said temperature being below such temperature as will cause fusion of said particles;
   (d) promptly thereafter depositing onto said layer finely-divided perfluorocarbon particles;
   (e) promptly thereafter working said particles into said enlarged fissures, and;
   (f) permitting said surface to cool to room temperature.
3. The process of claim 2 above in which the particles are polytetrafluoroethylene particles, said particles are below room temperature when applied, and the plated-on metal layer is hard chromium.
4. The process of claim 2 above in which the particles are polytetrafluoroethylene particles, said particles are below room temperature when applied, and the metallic layer is electroless nickel.
5. A process for renewing a metal surface having a multiplicity of minute fissures therein which contain perfluorocarbon polymer particles in some of said fissures, comprising the steps of:
   (a) cooling a multiplicity of finely-divided perfluorocarbon particles down to at least about −100° F.;
   (b) disposing said particles on the surface to be renewed while said surface is at about its temperature of usage and not more than 650° F. and;
   (c) brushing and otherwise compacting said particles into the fissures in said surface.
6. A process for renewing a metal surface having perfluorocarbon polymer particles in the interstices thereof comprising the steps of:
   (a) maintaining the temperature of said metal surface at an elevated temperature of about 300° F. to 400° F.;
   (b) depositing additional finely-divided perfluorocarbon polymer particles at below 60° F. on said metal surface at said elevated temperature, and;
   (c) brushing and working said polymer particles while said surface is still hot so as to dispose said particles in said interstices.
7. A process for treating a metal surface with finely-divided perfluorocarbon polymer particles which comprises:
   (a) plating said surface with a layer of hard chromium;
   (b) providing a multiplicity of minute fissures in said layer;
   (c) heating said layer to a temperature of between about 150° F. and 500° F.;
   (d) promptly disposing perfluorocarbon particles into said fissures, said particles being below room temperature; and,
   (e) permitting said layer and particles to reach a temperature equilibrium.
8. A process which comprises heating a porous surface to not more than 650° F., promptly thereafter disposing and compacting finely divided perfluorocarbon polymer particles in the pores of said surface, said particles being at a temperature of at least 250° F. below the temperature of said surface.
9. The process of claim 8 in which the particles are disposed and compacted in said pores by air blast techniques.
10. A process which comprises incorporating finely-divided perfluorocarbon polymer particles into a surface which has a multiplicity of minute pores therein in which said particles are disposed in said pores at a temperature of at least 250° F. below the temperature of said surface so that when said particles and surface reach temperature equilibrium, the particles are locked into said pores by an interference fit, fusion of said particles being avoided.
11. An article of manufacture comprising a surface of metal having a plurality of interstices, said interstices containing unfused particles of solid, plastic perfluorocarbon therein, the surface area occupied by said particles amounting to about 5% to 75% of the total surface area, the average size of said plastic particles being about 0.05 to 10 microns, said particles being held in said interstices by an interference fit effected by a differential in temperature between said surface and said particles when such particles were disposed in said interstices.
12. A mold for forming polymeric articles, the interior surface of said mold being substantially smooth except for a plurality of fine interstices therein, said interstices being filled with solid, plastic unfused polytetrafluoroethylene particles having an average particle size less than 5 microns and comprising 15 to 75% of the interior surface area of said mold, the remainder of the metal surface being substantially free of polytetrafluoroethylene, said particles being held in said interstices by an interference fit effected by a differential in temperature between said surface and said particles when such particles were disposed in said interstices.
13. The mold of claim 12 in which the interior surface of said mold is provided with a zinc phosphate coating and the polytetrafluoroethylene particles are disposed in the interstices of said coating.
14. The mold of claim 12 in which the interior surface of said mold is provided with a layer of plated-on chromium and the polytetrafluoroethylene particles are disposed in interstices formed in said chromium layer.
15. The mold of claim 12 in which the interior surface of said mold is provided with a layer of electroless nickel and the polytetrafluoroethylene particles are disposed in interstices formed in said electroless nickel layer.
16. An article of manufacture comprising a surface having a plated-on layer of chromium, interstices having been formed in said chromium layer, unfused particles of polytetrafluoroethylene being disposed in said interstices and being held therein by an interference fit, said particles having an average particle size of less than 30 microns and comprising at least 10% of said surface area.
17. An article of manufacture comprising a surface having a zinc phosphate layer thereon, unfused particles of polytetrafluoroethylene being disposed in the pores in said phosphate layer and being held therein by an interference fit, said particles having an average particle size of less than 30 microns and comprising at least 10% of said surface area.
18. An article of manufacture comprising a surface having a plated-on layer of nickel, interstices having been formed in said nickel layer, unfused particles of polytetrafluoroethylene being disposed in said interstices and being held therein by an interference fit, said particles having an average particle size of less than 30 microns and comprising at least 10% of said surface area.

19. An article of manufacture comprising an anodized aluminum surface having a multiplicity of interstices therein, unfused particles of polytetrafluoroethylene being disposed in said interstices and being held therein by an interference fit, said particles having an average particle size of less than 30 microns and comprising at least 10% of said surface area.

References Cited by the Examiner

UNITED STATES PATENTS

| | | |
|---|---|---|
| 2,647,079 | 7/1953 | Burnham. |
| 2,691,814 | 10/1954 | Tait. |
| 2,802,897 | 8/1957 | Hurd et al. |
| 2,813,041 | 11/1957 | Mitchell et al. |
| 2,825,706 | 3/1958 | Sanders. |
| 2,944,917 | 7/1960 | Cahne _____ 117—132 X |
| 3,115,419 | 12/1963 | Dale _____ 117—49 |

FOREIGN PATENTS 1,061,029  11/1953  France.

OTHER REFERENCES

Rudner: Fluorocarbons, 1958, Reinhold Pub. Corp., New York, pp. 90–96, 198, QD181R1R86.

ALFRED L. LEAVITT, *Primary Examiner.*

RALPH S. KENDALL, *Examiner.*